United States Patent
Demsky et al.

(10) Patent No.: US 7,421,401 B2
(45) Date of Patent: Sep. 2, 2008

(54) METHOD OF ARRANGING SUPPLEMENTAL MEETING SERVICES

(75) Inventors: Scott H. Demsky, Boca Raton, FL (US); Robert M. Szabo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 10/273,473

(22) Filed: Oct. 18, 2002

(65) Prior Publication Data

US 2004/0078255 A1    Apr. 22, 2004

(51) Int. Cl.
G06F 9/46    (2006.01)

(52) U.S. Cl. ............................ 705/8; 705/9; 379/202.01

(58) Field of Classification Search .................. 705/8; 379/202.01
See application file for complete search history.

(56) References Cited

U.S. PATENT DOCUMENTS

| | | | | |
|---|---|---|---|---|
| 4,577,065 A | * | 3/1986 | Frey et al. ............... | 379/204.01 |
| 5,408,518 A | | 4/1995 | Yunoki ....................... | 379/67 |
| 5,483,588 A | | 1/1996 | Eaton et al. ................ | 379/202 |
| 5,495,286 A | * | 2/1996 | Adair ......................... | 348/68 |
| 5,594,859 A | | 1/1997 | Palmer et al. .............. | 395/330 |
| 5,642,156 A | * | 6/1997 | Saiki ........................ | 348/14.09 |
| 5,644,715 A | | 7/1997 | Baugher .................... | 395/200.04 |
| 5,719,928 A | * | 2/1998 | Pinnell et al. ............ | 379/202.01 |
| 5,828,743 A | | 10/1998 | Pinnell et al. ............. | 379/204 |
| 5,852,466 A | | 12/1998 | Komine et al. ............ | 348/15 |
| 5,903,629 A | * | 5/1999 | Campbell et al. ......... | 379/88.24 |
| 5,991,276 A | | 11/1999 | Yamamoto ................. | 370/260 |
| 6,061,440 A | | 5/2000 | Delaney et al. ............ | 379/202 |
| 6,101,480 A | * | 8/2000 | Conmy et al. .............. | 705/9 |
| 6,151,619 A | | 11/2000 | Riddle ....................... | 709/204 |
| 6,275,575 B1 | | 8/2001 | Wu ............................ | 379/202.01 |
| 6,298,129 B1 | | 10/2001 | Culver et al. .............. | 379/202 |
| 6,330,321 B2 | | 12/2001 | Detampel, Jr. et al. .. | 379/205.01 |
| 6,363,352 B1 | * | 3/2002 | Dailey et al. .............. | 705/9 |
| 6,411,605 B1 | * | 6/2002 | Vance et al. ............... | 370/261 |
| 6,798,753 B1 | * | 9/2004 | Doganata et al. .......... | 370/260 |
| 6,876,734 B1 | * | 4/2005 | Summers et al. .......... | 379/202.01 |
| 6,907,449 B2 | * | 6/2005 | Srinivasan ................. | 709/204 |
| 7,027,995 B2 | * | 4/2006 | Kaufman et al. ........... | 705/8 |

(Continued)

OTHER PUBLICATIONS

Doan, Amy. Meeting Maker 4.0 Increases Scalability. InfoWorld; Framingham; Jan. 6, 1997 proquest.*

(Continued)

*Primary Examiner*—Beth Van Doren
*Assistant Examiner*—Johnna Loftis
(74) *Attorney, Agent, or Firm*—Akerman Senterfitt

(57) ABSTRACT

A method of scheduling meetings within a calendaring system can include receiving a meeting request specifying a meeting time, at least one participant, and a supplemental meeting service to be scheduled concurrently with the meeting. A determination can be made that a supplemental meeting system is not available. Accordingly, participants can be notified of the meeting time and that supplemental meeting service information has not been determined. The method also can include attempting to obtain the supplemental meeting service information from the supplemental meeting system until a predetermined time prior to the meeting time. If the supplemental meeting service information is obtained before the predetermined time prior to the meeting time, the participants can be notified of the supplemental meeting service information.

14 Claims, 3 Drawing Sheets

U.S. PATENT DOCUMENTS 7,082,402 B2 * 7/2006 Conmy et al. .................. 705/8
2002/0188490 A1 * 12/2002 Kruse ............................ 705/8

OTHER PUBLICATIONS

Johnson, WJ and Weber, OW. Method for Automatic Meeting Update upon Requester's Anticipated Change of Expected Attendees. Jan. 1, 1994.*

Dugan, PA; Fitzpatrick, GP; Williams, ML. Calendar Event Status Association Mechanism. Feb. 1, 1993.*

Borland, Russell. Running Microsoft Outlook 1997. Jun. 25, 1997.*

Smith, Ben; Eglowstein, Howard. Scheduling Across the Enterprise. Byte; Peterborough; Jun. 1994.*

Gentner Integrates Instant Access Confrence Calling with Lotus Notes Calendar and Lotus Sametime Meeting Center. Business Wire. New York: Dec. 5, 2000.*

* cited by examiner

METHOD OF ARRANGING SUPPLEMENTAL MEETING SERVICES

BACKGROUND

1. Field of the Invention

The present invention relates to the field of calendaring and scheduling systems and, more particularly, to arranging meetings and supplemental meeting services through the calendaring system.

2. Description of the Related Art

Colleagues often experience a need to work with one another in a cooperative fashion despite, for one reason or another, not being able to work together in person. Modern technologies such as teleconferencing and electronic meetings make such interactions possible. Teleconferencing, as is well known in the art, allows several persons to participate in a telephone conversation from two or more different locations. Electronic meeting applications such as Lotus Sametime, available from International Business Machines Corporation of Armonk, N.Y., permit persons to view common images as if each person was located at the same location and viewing the same display.

The advent of multi-party calendaring systems, such as Lotus Notes which also is available from International Business Machines Corporation, facilitates the scheduling of multi-party meetings by determining whether prospective meeting participants are available at designated times, by sending invitations to join meetings to designated recipients, as well as scheduling an agreed upon meeting time, meeting duration, and date within each participant's individual calendar. While some calendaring systems attempt to provide functionality beyond time management and multi-party scheduling, these conventional calendaring systems have been unable to tightly integrate functionality relating to supplemental meeting services including, but not limited to, provisioning a teleconference line, canceling a reserved teleconference line, or arranging an electronic meeting space.

Presently, when scheduling a teleconference, conventional calendaring systems allow a meeting owner to automatically generate a one-time teleconference phone number to be used in conjunction with the meeting. In such cases, the meeting owner typically is a registered user of a third party teleconference system. Accordingly, scheduling the meeting via the calendaring system also initiates the scheduling of the teleconference with the teleconference system. Any charges for establishing and using the teleconference number, or call-in number, are routed to the meeting owner or to another entity to be billed such as the department or business entity in which the meeting owner works.

Still, for a calendaring system to schedule a meeting and a teleconference with an automatically generated teleconference number, conventional calendaring systems must be communicatively linked with the teleconference system. Otherwise, the calendaring system will not schedule the meeting as a "teleconferenc". Rather, the calendaring system will inform the meeting owner that the teleconferencing service is currently unavailable and ask the meeting owner to try again at a later time.

In consequence, the owner may choose to schedule the meeting via the calendaring system without the teleconference number. In that case, the meeting owner must continue to contact the teleconference system manually, outside of the calendaring system environment, in an effort to obtain a teleconference number. If the teleconference system does become available and a teleconference is successfully scheduled, the meeting owner must generate a meeting notification manually which specifies the teleconference details and then distribute the notification to the participants via the calendaring system. If, however, the teleconference system does not become available, the meeting owner can manually generate and send a cancellation notice to the other participants.

In the event that a meeting owner wishes to cancel a previously scheduled meeting and teleconference through the calendaring system, the teleconference system also must be available to the calendaring system for purposes of notification. If not, the calendaring system may cancel the meeting, but the scheduled teleconference will not be cancelled as the teleconference system is not available. In that case, the calendaring system informs the meeting owner that the teleconference system is not available and asks the meeting owner to try to cancel the scheduled teleconference at a later time. Thus, the meeting owner is forced to continually try to cancel the meeting in a manual fashion outside of the calendaring system environment until the teleconference system does become available. Typically, if the teleconference is not cancelled within a predetermined time before the scheduled teleconference time, the meeting owner likely will be charged for the establishment of the teleconference even though no teleconference took place.

If electronic meeting software is to be used in conjunction with a scheduled meeting, such arrangements typically must be performed independently of the calendaring system. That is, the meeting owner must schedule the electronic meeting with the electronic meeting system, obtain confirmation from the electronic meeting system, and, through the calendaring system, manually generate and send a notification to each participant indicating that an associated electronic meeting has been scheduled. The instructions for participating in the electronic meeting also must be provided.

The lack of integration between conventional calendaring systems and supplemental meeting systems such as teleconference systems and electronic meeting systems, forces meeting owners to expend significant time arranging meetings, leading to increased costs. In addition to the costs associated with meeting arrangements, meeting owners often incur additional expenses resulting from last minute cancellations.

SUMMARY OF THE INVENTION

The invention disclosed herein provides a solution for integrating supplemental meeting services with a calendaring system. In particular, the present invention can integrate the scheduling, rescheduling, and cancellation of supplemental meeting services such as teleconferences and/or electronic meetings with calendaring functions such as meeting scheduling and meeting notifications. Accordingly, from within a calendaring system, various tasks associated with arranging supplemental meeting services can be performed. Notably, any arrangements made from within the calendaring system can be provided to participants automatically, thereby alleviating the need for a meeting owner to manually distribute any information regarding the supplemental meeting service.

One aspect of the present invention can include a method of scheduling meetings within a calendaring system. The method can include receiving a meeting request specifying a meeting time, at least one participant, and a supplemental meeting service to be scheduled concurrently with the meeting. A supplemental meeting system can be contacted to determine supplemental meeting service information for the supplemental meeting service. A determination can be made that a supplemental meeting system, that is the system through which the supplemental meeting service is to be scheduled, is not available. Accordingly, the participants can be notified of the meeting time and that the supplemental meeting service information has not been determined. The method further can include attempting to obtain the supplemental meeting service information from the supplemental meeting system until a predetermined time prior to the meeting time.

If the supplemental meeting service is a teleconference, the supplemental meeting service information can specify a teleconference number as well as instructions for accessing the teleconference. If the supplemental meeting service is an electronic meeting, the supplemental meeting service information can specify an address of the electronic meeting and instructions for accessing the electronic meeting.

If the supplemental meeting service information is obtained before the predetermined time prior to the meeting time, the participants can be notified of the supplemental meeting service information. Notably, in the case where one of the participants has been identified as a meeting owner, if the supplemental meeting service information is not obtained before the predetermined time prior to the meeting time, the meeting owner can be queried whether to notify the participants of any supplemental meeting service information that is determined by the meeting owner outside of the calendaring system. For example, the meeting owner can manually arrange a teleconference or an electronic meeting and include that information within a notification distributed via the calendaring system. Alternatively, the meeting owner can be queried whether to notify the participants that the meeting has been cancelled.

Another aspect of the present invention can include a method of canceling meetings within a calendaring system. The method can include receiving a request to cancel a scheduled meeting and an associated supplemental meeting service involving at least one participant. A determination can be made that a supplemental meeting system such as a teleconference system or an electronic meeting system is unavailable. The time when the request to cancel is received can be recorded. The participants can be notified that the scheduled meeting has been cancelled. Accordingly, when the supplemental meeting system becomes available, the supplemental meeting system can be notified that the supplemental meeting service has been cancelled and can be provided with the time in which the request to cancel was received.

Another aspect of the present invention can include a method of rescheduling an existing meeting and an associated supplemental meeting service within a calendaring system. As noted, the supplemental meeting service can be a teleconference or an electronic meeting. The method can include receiving a request to reschedule the meeting and the associated supplemental meeting service involving one or more participants. The request can specify a rescheduled meeting time. Accordingly, a cancellation of the existing meeting service can be sent to a supplemental meeting system as well as a request for a supplemental meeting service to be made available at the rescheduled meeting time. Supplemental meeting service information for the rescheduled meeting time can be received.

Accordingly, the participants can be notified of the rescheduled meeting time as well as the supplemental meeting service information for the rescheduled meeting time. If the supplemental meeting service is a teleconference, the supplemental meeting service information can specify a teleconference number and instructions for accessing the teleconference. Alternatively, if the supplemental meeting service is an electronic meeting, the supplemental meeting service information can specify an address of the electronic meeting as well as instructions for accessing the electronic meeting.

Yet another aspect of the present invention can include a method of scheduling a meeting within a calendaring system. The method can include, responsive to a request to schedule a meeting at a designated meeting time and with designated participants, querying a requesting participant to schedule an associated electronic meeting. Responsive to a request to schedule an electronic meeting, an electronic meeting for the designated time can be requested from an electronic meeting system. Electronic meeting information can be received from the electronic meeting system. For example, the electronic meeting information can specify instructions for connecting to the electronic meeting. Accordingly, the participants can be notified of the meeting time, the electronic meeting, and the electronic meeting information.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for integrating supplemental meeting services including teleconferencing and electronic meetings with a calendaring system. In particular, the present invention can integrate the scheduling, rescheduling, and cancellation of supplemental meeting services with calendaring functions such as meeting scheduling and meeting notifications. Accordingly, various tasks associated with the arrangement of supplemental meeting services can be automated from within the calendaring system.

Figures 1, 2:
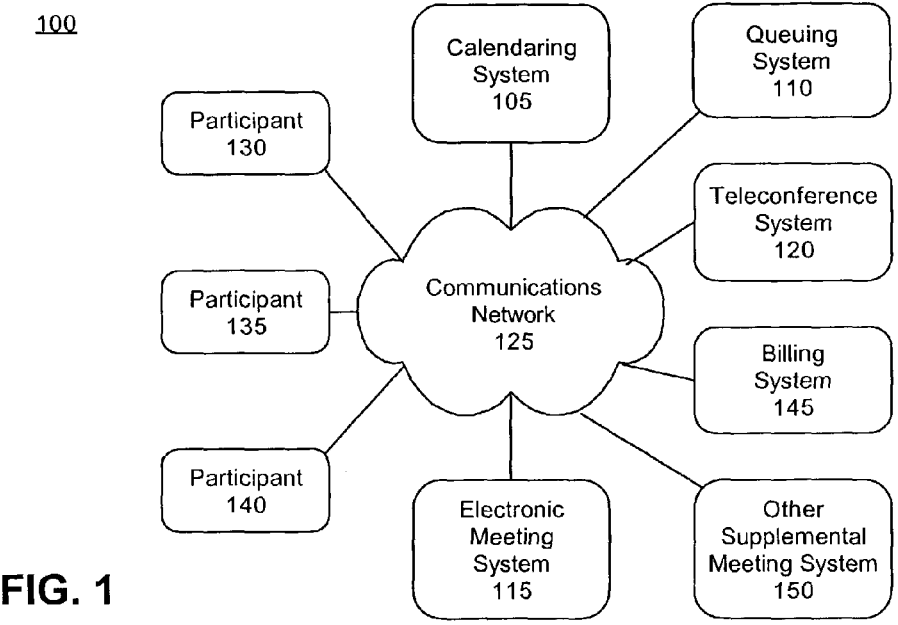
FIG. 1 is a schematic diagram illustrating a system for managing supplemental meeting services in accordance with the inventive arrangements disclosed herein.
FIG. 2 is a schematic diagram illustrating a graphical user interface for use with the system of FIG. 1.

FIG. 1 is a schematic diagram illustrating a system 100 for managing supplemental meeting services in accordance with the inventive arrangements disclosed herein. As shown in FIG. 1, the system 100 can include a calendaring system 105, a queuing system 110, an electronic meeting system 115, a teleconference system 120, and a billing system 145, each communicatively linked via a communications network 125. An additional supplemental meeting system 150 also is communicatively linked with the components of system 100 via the communications network 125 as the present invention can be used with supplemental meeting services beyond teleconferencing and electronic meetings. The calendaring system 105 can provide calendaring functions, including meeting notifications, invitations, and scheduling for one or more participants 130, 135, and 140. The calendaring system 105 can be configured to arrange one or more supplemental meeting services to be used or take place concurrently with a scheduled meeting.

The queuing system 110 can be any of a variety of persistent messaging systems serving as an interface between the calendaring system 105, the electronic meeting system 115, and the teleconference system 120. The queuing system 110 can be implemented as a retry mechanism, a message queue, a commercially available messaging system, or as any other suitable persistent messaging mechanism. Although depicted as a separate entity, the queuing system 110 can be distributed across a network such that components of the queuing system 110 are included as part the various elements of system 100. For example, the calendaring system 105, any clients of the calendaring system 105 used by participants 130, 135, and 140, the electronic meeting system 115, the teleconference system 120, the billing system 145, and/or the other supplemental meeting system 150 can include queuing system components or clients enabling each element in which the queuing system component is disposed to implement persistent messaging. Accordingly, each of the aforementioned elements of system 100 can store messages until such time when the message is successfully delivered.

In any case, the queuing system 110 can be configured to record the time in which messages are received from the calendaring system 105, the electronic meeting system 115, and/or the teleconference system 120. Accordingly, when a message is delivered from the queuing system 110, the time in which the message was sent from the originating system can be sent with or included within the message, notification, or request.

The teleconference system 120 can provide teleconference numbers to one or more requesting meeting participants such that each participant need only call the teleconference number and, if necessary, enter an assigned password or other identifier to participate in a scheduled teleconference. The electronic meeting system 115 enables participants of an electronic meeting to view common images as if each person was located at the same location and viewing the same display. The electronic meeting system 115 provides an electronic meeting place, for example specified as a uniform resource locator or other network address. The electronic meeting system 115 enables a meeting owner to control which images are shown to the other electronic meeting participants.

The billing system 145 can track the usage of supplemental meeting services such as conference calls and/or electronic meetings. In particular, the billing system 145 can monitor whether a particular service has been rescheduled, has been cancelled, as well as whether such actions took place within predetermined cancellation time limits. That is, the billing system 145 can be configured to charge for cancellations and rescheduling if such notifications do not specify an originating time, to be described herein in greater detail, which is at least a predetermined time prior to a scheduled supplemental meeting service time. Notably, although a single billing system 145 is depicted, each supplemental meeting service, especially in the case where such services are provided by third parties unrelated to the calendaring system 105, can include a billing system.

In operation, a meeting owner such as participant 130 can request a meeting with one or more other participants 135 and 140 through the calendaring system 105. Notably the calendaring system 105 can determine a time in which each of the designated meeting participants is available according to each participant's individual calendar. During the course of requesting a meeting, the calendaring system 105 can query the participant 130 whether a supplemental meeting service such as a teleconference or an electronic meeting should be scheduled to run concurrently with the scheduled meeting. If the participant 130 does wish to schedule a supplemental meeting service, the calendaring system can send a request to the electronic meeting system 115, the teleconference system 120, or both as the case may be, to schedule a supplemental meeting service.

In the event the electronic meeting system 115 or the teleconference system 120 is not available, for example where either system is offline, not responding to received requests, or where communications between the queuing system 110 and the supplemental meeting systems have been disrupted, the queuing system 110 can monitor the supplemental service meeting system to determine when the supplemental meeting system is again online or available. For example, the queuing system 110 can continue attempting the delivery of the request to each respective supplemental meeting system until such time as a confirmation or reply is received. Notably, the queuing system 110 can continue attempting delivery of the request for supplemental meeting services until a predetermined amount of time prior to the requested meeting time.

If the supplemental meeting systems are offline, the calendaring system 105 can send a meeting notification to designated meeting participants specifying a meeting time. Such a meeting notification, however, would not specify information for supplemental meeting services. In that case, an updated meeting notification can be distributed to the designated meeting participants at such time when the supplemental meeting service information is determined or received by the calendaring system 105 from one or more supplemental meeting systems.

If confirmation of the scheduled supplemental meeting service is received by the calendaring system 105 via the queuing system 110, the calendaring system 105 can send a notification to the participants notifying each of the scheduled meeting and the scheduled supplemental meeting service. The notification can specify any access information such as an address for an electronic meeting, a teleconference number for a teleconference, as well as any instructions including passwords and/or other identifiers required to access the supplemental meeting service which may be specified within the supplemental meeting system confirmation.

FIG. 2 is a schematic diagram illustrating an exemplary graphical user interface (GUI) 200 for use with the system of FIG. 1. More particularly, the GUI 200 depicts the teleconference and electronic meeting request portion of a meeting request GUI for the calendaring system. The GUI 200 can include one or more segments 205, 210, 215, 220, and 225 which enable a meeting participant to specify a teleconference service provider, a moderator, the number of toll and toll-free lines required for a teleconference, whether entry and/or exit tones are to be played, as well as whether an electronic meeting is to be scheduled. Notably, segment 230 can indicate any teleconference information including, but not limited to, a dial-in number for the teleconference to be used by meeting participants located within the U.S.A., a dial-in number for the teleconference to be used by meeting participants located outside of the U.S.A, and a teleconference password. After obtaining the information specified in segment 230, the calendaring system can include that information within one or more meeting notifications automatically which can be distributed to the meeting participants.

Figure 3:
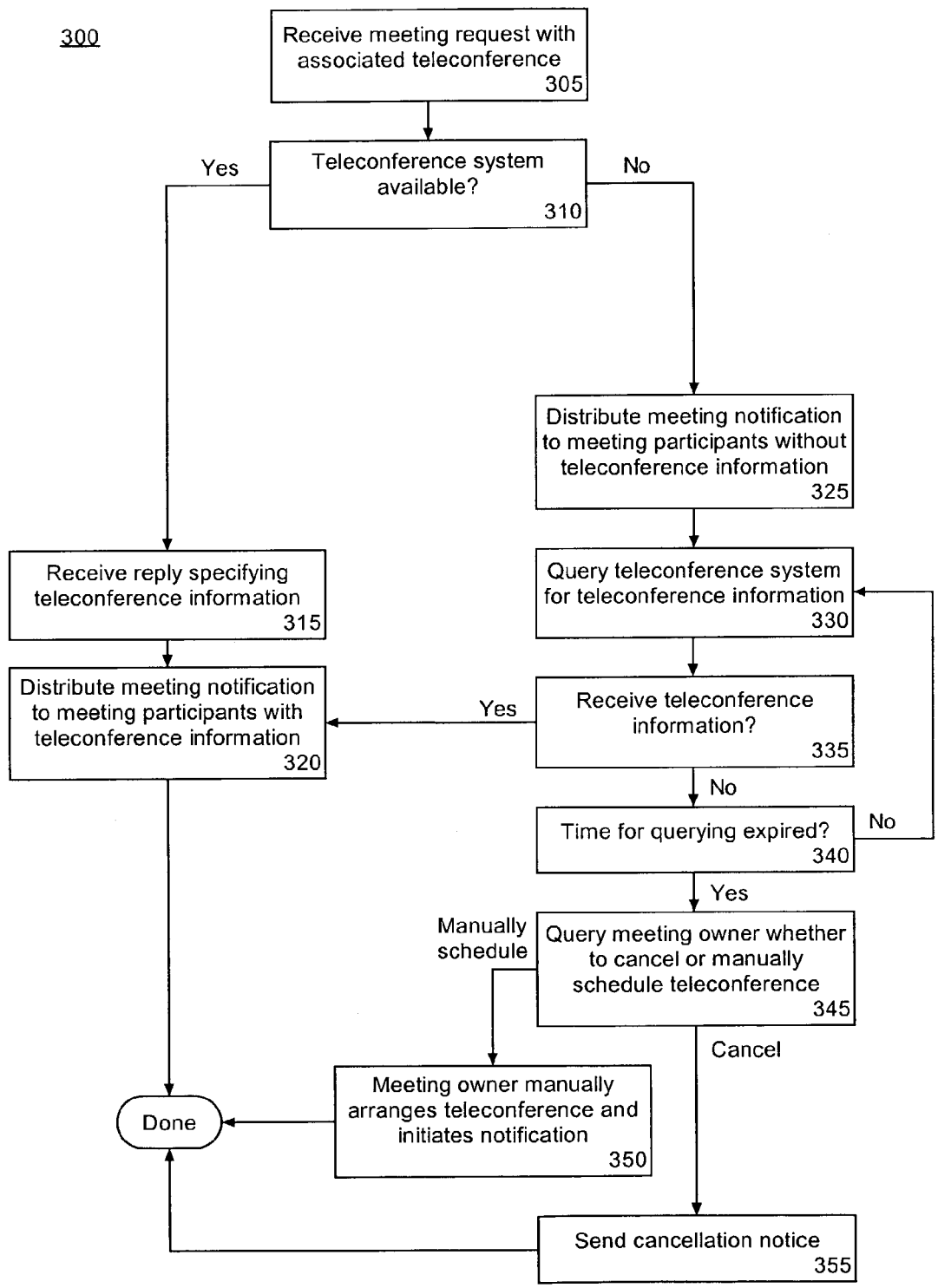
FIG. 3 is a flow chart illustrating a method of scheduling a meeting and a supplemental meeting service in accordance with the inventive arrangements disclosed herein.

FIG. 3 is a flow chart illustrating a method 300 of scheduling a meeting and a supplemental meeting service in accordance with the inventive arrangements disclosed herein. Although the method 300 is described with reference to a scheduled teleconference, those skilled in the art will recognize that a similar method can be performed to the schedule an electronic meeting. Accordingly, the method 300 can begin in a state wherein a meeting owner has requested a meeting and teleconference with one or more other designated meeting participants. For example using a GUI such as the GUI of FIG. 2, a meeting owner can specify one or more other participants to be included within the meeting. Thus, in step 305, the calendaring system can receive a request from the meeting owner to schedule a meeting with one or more other participants and to schedule a teleconference with a third party teleconference system.

In step 310, the calendaring system can determine whether the teleconference system is available. For example, via the queuing system, the calendaring system can send a request to the teleconference system for a teleconference dial-in number to be assigned for use at the time and date specified within meeting request. The teleconference request also can specify a desired teleconference duration equal to the meeting duration specified in the meeting request. Information such as the number of lines, international lines, toll lines, and/or toll-free lines can be specified as well. Still, those skilled in the art will recognize that any of a variety of techniques, for example pinging, can be used to determine whether the teleconference system is available.

If the teleconference system is unavailable, for example in the case where the teleconference system is non-responsive to one or more requests, the method can proceed to step 325. If the teleconference system is available, the method can proceed to step 315 where a reply or confirmation specifying teleconference information is received from the teleconference system. Notably, the teleconference information can specify one or more teleconference numbers, whether directory numbers, extensions, tie-lines, international numbers, toll numbers, and/or toll-free numbers, as well as additional information including, but not limited to, any necessary instructions, for example passwords or identifiers, to be used by participants when accessing the teleconference.

In step 320, the calendaring system can distribute a meeting notification to each meeting participant specified by the meeting owner, for example in the meeting request received in step 305. The meeting notification can include any teleconference information specified by the teleconference system. In particular, the calendaring system can extract teleconference information from a received teleconference system confirmation or reply and insert that information into the distributed meeting notification.

In step 325, in the case where no reply was received from the teleconference system, a meeting notification can be distributed to the meeting participants indicating the time of the scheduled meeting. The distributed notification further can indicate that no teleconference information has been determined for the meeting, but that such information may be forthcoming.

In step 330, the teleconference system can be queried by the queuing system. In particular, a request to schedule a teleconference, obtain a teleconference number, and any other necessary teleconference information can be sent to the teleconference service. In step 335, the queue system can determine whether a response or confirmation from the teleconference system specifying teleconference information has been received. If no such response is received, for example within a predetermined time-out period, the method can continue to step 340. If a response specifying the teleconference information is received in step 335, however, the method can proceed to step 320 where an updated meeting notification can be distributed to the meeting participants specifying the received teleconference information.

In step 340, a determination can be made as to whether any time remains for requesting a teleconference. The queuing system can be configured to continually send requests to the teleconference system until such time as a teleconference is successfully scheduled, or until a predetermined time period prior to the scheduled meeting time. For example, if the meeting notification is for 3:00 p.m., the queuing system can be configured to continue attempting to schedule a teleconference with the teleconference system until 10 minutes prior to the 3:00 p.m. meeting time, or until 2:50 p.m. Still, it should be appreciated that the queuing system can utilize any of a variety of messaging techniques to determine whether the teleconference system is available. For example, the teleconference system can be pinged and if a response is received, a teleconference request then can be sent.

If time remains to continue querying the teleconference system, the method can loop back to step 330 and continue attempts to schedule a teleconference. The method can repeat in this manner until no time is left prior to the scheduled meeting, or until the teleconference is successfully scheduled. If no time remains, the method can continue to step 345. In step 345, the meeting owner can be queried by the calendaring system as to whether the scheduled meeting should be cancelled or the meeting owner prefers to manually schedule a teleconference outside of the calendaring system.

If the meeting owner prefers to manually schedule the teleconference, the method can proceed to step 350 where any further action with regard to scheduling a teleconference to take place concurrently with the scheduled meeting is handled manually by the meeting owner outside of the calendaring system. Notably, if the meeting owner successfully schedules such a teleconference with a teleconference system, the teleconference information can be manually included by the meeting owner within an updated or a new meeting notification to be distributed to the participants via the calendaring system. If in step 355 the meeting owner chooses to cancel the scheduled meeting, the calendaring system can distribute a cancellation notice to each of the meeting participants.

As mentioned, the method disclosed in reference to FIG. 3 also can be applied to the case wherein a meeting owner desires to schedule an electronic meeting to take place concurrently with a scheduled meeting. Accordingly, rather than teleconference information being received from a teleconference system, the calendaring system can receive electronic meeting information from an electronic meeting system. The electronic meeting information can include a uniform resource locator or other network address corresponding to a designated electronic meeting place and any instructions necessary for accessing the electronic meeting.

Figure 4:
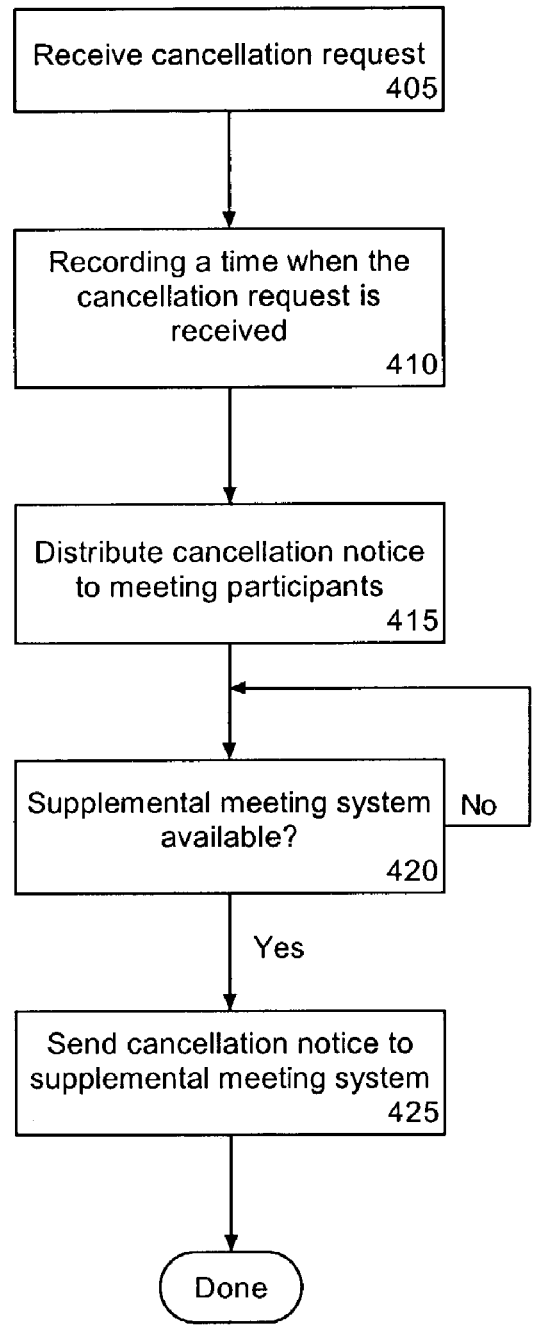
FIG. 4 is a flow chart illustrating a method of canceling a scheduled supplemental meeting service in accordance with the inventive arrangements disclosed herein.

FIG. 4 is a flow chart illustrating a method 400 of canceling a scheduled supplemental meeting service in accordance with the inventive arrangements disclosed herein. The method 400 can begin in a state wherein a meeting involving one or more meeting participants has been scheduled through the calendaring system. Additionally, at least one supplemental meeting service such as a teleconference and/or an electronic meeting also has been scheduled to take place concurrently with the scheduled meeting. Accordingly, in step 405, the calendaring system can receive a request, from a meeting participant such as the meeting owner, to cancel a scheduled meeting as well as any other supplemental meeting services scheduled concurrently or associated with the meeting.

In step 410, the calendaring system can record the time when the cancellation request was received from the meeting participant. In step 415, the calendaring system can distribute a notice to each of the meeting participants indicating that the scheduled meeting has been cancelled. Proceeding with step 420, the calendaring system can send a cancellation notification to the supplemental meeting system via the queuing system. The cancellation notification can include the time in which the cancellation request was initially received by the calendaring system from the meeting owner.

In step 425, the queuing system can determine when the supplemental meeting system becomes available and ensure that the cancellation request is delivered to the supplemental meeting system at that time or shortly thereafter. As the cancellation request includes a time when the request was first received by the calendaring system, the supplemental meeting system can determine whether any billing charges will accrue due to untimely cancellation. For example, as many billing systems require cancellation prior to a predetermined time before a scheduled teleconference and/or electronic meeting, the supplemental meeting system can compare the time in which the cancellation request was received with the meeting time to determine whether any such requirements have been violated. Accordingly, the meeting owner can avoid any late charges that would otherwise result from the supplemental meeting system being offline and not able to receive a cancellation notice.

Another aspect of the present invention can include a method of rescheduling a meeting. The method can include a combination of steps discussed with reference to FIGS. 3 and 4. For example, the calendaring system can receive a request for rescheduling a meeting and concurrent supplemental meeting service. The request to reschedule can specify that a scheduled meeting and a concurrently scheduled supplemental meeting service such as a teleconference or an electronic meeting is to be cancelled. The cancellation request also can specify a time and duration for a new meeting and supplemental meeting service to be scheduled. The request to reschedule can be provided to the supplemental meeting service via the queuing system.

If the calendaring system receives confirmation of the rescheduled supplemental meeting service, the calendaring system can distribute a meeting notification advising each meeting participant of any changes. Persistent messaging techniques as previously disclosed can be used to ensure that the originally scheduled supplemental meeting service is cancelled and that a new supplemental meeting service is arranged.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A calendaring system for scheduling meetings comprising:
    means for receiving a meeting request specifying a meeting time, at least one participant, and a supplemental meeting service to be scheduled concurrently with the meeting;
    means for contacting a supplemental meeting system to determine supplemental meeting service information for the supplemental meeting service;
    means for determining that the supplemental meeting system is not available;
    means for notifying the participants of the meeting time and that the supplemental meeting service information has not been determined;
    means for repeatedly attempting to obtain the supplemental meeting service information from the supplemental meeting system until a predetermined time prior to the meeting time;
    means for notifying the participants of the supplemental meeting service information if the supplemental meeting service information is obtained before the predetermined time prior to the meeting time;
    means for querying the meeting owner whether to notify the participants of supplemental meeting service information determined outside of the calendaring system if the supplemental meeting service information is not obtained before the predetermined time prior to the meeting time;
    means for querying the meeting owner whether to notify the participants that the meeting has been cancelled if the supplemental meeting service information is not obtained before the predetermined time prior to the meeting time.

2. The system of claim 1, wherein the supplemental meeting service is a teleconference and the supplemental meeting service information specifies at least a teleconference number.

3. The system of claim 2, wherein the supplemental meeting service information further specifies instructions for accessing the teleconference.

4. The system of claim 1, wherein the supplemental meeting service is an electronic meeting and the supplemental meeting service information specifies at least an address of the electronic meeting.

5. The method system of claim 4, wherein the supplemental meeting service information further specifies instructions for accessing the electronic meeting.

6. A calendaring system for scheduling a meeting comprising:
    means for prompting a requestor to schedule an associated electronic meeting responsive to a request to schedule the meeting at a designated meeting time and with designated participants;
    means for contacting an electronic meeting system and requesting electronic meeting information for an electronic meeting for the designated time from the electronic meeting system responsive to a request to schedule an electronic meeting;
    means for determining that the electronic meeting system is not available and notifying the participants that the electronic meeting system has not been determined;
    means for repeatedly attempting to obtain information for the electronic meeting until a predetermined time prior to the designated time;
    means for notifying the participants of the meeting time, the electronic meeting and the electronic meeting information if electronic meeting information is obtained from the electronic meeting system before the predetermined time prior to the designated time;

means for querying the meeting owner whether to notify the participants of supplemental meeting service information determined outside of the calendaring system if the supplemental meeting service information is not obtained before the predetermined time prior to the meeting time;

means for querying the meeting owner whether to notify the participants that the meeting has been cancelled if the supplemental meeting service information is not obtained before the predetermined time prior to the meeting time.

7. The system of claim 6, said notifying step further comprising:

means for providing the participants with instructions for connecting to the electronic meeting.

8. A machine readable storage, having stored thereon a computer program implementation of a calendaring system, having a plurality of code sections executable by a machine for causing the machine to perform the steps of:

receiving a meeting request specifying a meeting time, at least one participant, and a supplemental meeting service to be scheduled concurrently with the meeting;

contacting a supplemental meeting system to determine supplemental meeting service information for the supplemental meeting service;

determining that the supplemental meeting system is not available;

notifying the participants of the meeting time and that the supplemental meeting service information has not been determined;

repeatedly attempting to obtain the supplemental meeting service information from the supplemental meeting system until a predetermined time prior to the meeting time;

notifying the participants of the supplemental meeting service information if the supplemental meeting service information is obtained before the predetermined time prior to the meeting time;

querying the meeting owner whether to notify the participants of supplemental meeting service information determined outside of the calendaring system if the supplemental meeting service information is not obtained before the predetermined time prior to the meeting time;

querying the meeting owner whether to notify the participants that the meeting has been cancelled if the supplemental meeting service information is not obtained before the predetermined time prior to the meeting time.

9. The machine-readable storage of claim 8, wherein the supplemental meeting service is a teleconference and the supplemental meeting service information specifies at least a teleconference number.

10. The machine-readable storage of claim 9, wherein the supplemental meeting service information further specifies instructions for accessing the teleconference.

11. The machine-readable storage of claim 8, wherein the supplemental meeting service is an electronic meeting and the supplemental meeting service information specifies at least an address of the electronic meeting.

12. The machine-readable storage of claim 11, wherein the supplemental meeting service information further specifies instructions for accessing the electronic meeting.

13. A machine readable storage, having stored thereon a computer program implementation of a calendaring system, having a plurality of code sections executable by a machine for causing the machine to perform the steps of:

prompting a requestor to schedule an associated electronic meeting responsive to a request to schedule the meeting at a designated meeting time and with designated participants;

contacting an electronic meeting system and requesting electronic meeting information for an electronic meeting for the designated time from the electronic meeting system responsive to a request to schedule an electronic meeting;

determining that the electronic meeting system is not available and notifying the participants that the electronic meeting system has not been determined;

repeatedly attempting to obtain information for the electronic meeting until a predetermined time prior to the designated time;

notifying the participants of the meeting time, the electronic meeting and the electronic meeting information if electronic meeting information is obtained from the electronic meeting system before the predetermined time prior to the designated time;

querying the meeting owner whether to notify the participants of supplemental meeting service information determined outside of the calendaring system if the supplemental meeting service information is not obtained before the predetermined time prior to the meeting time;

querying the meeting owner whether to notify the participants that the meeting has been cancelled if the supplemental meeting service information is not obtained before the predetermined time prior to the meeting time.

14. The machine-readable storage of claim 13, said notifying step further comprising:

providing the participants with instructions for connecting to the electronic meeting.

* * * * *